Figure 1:
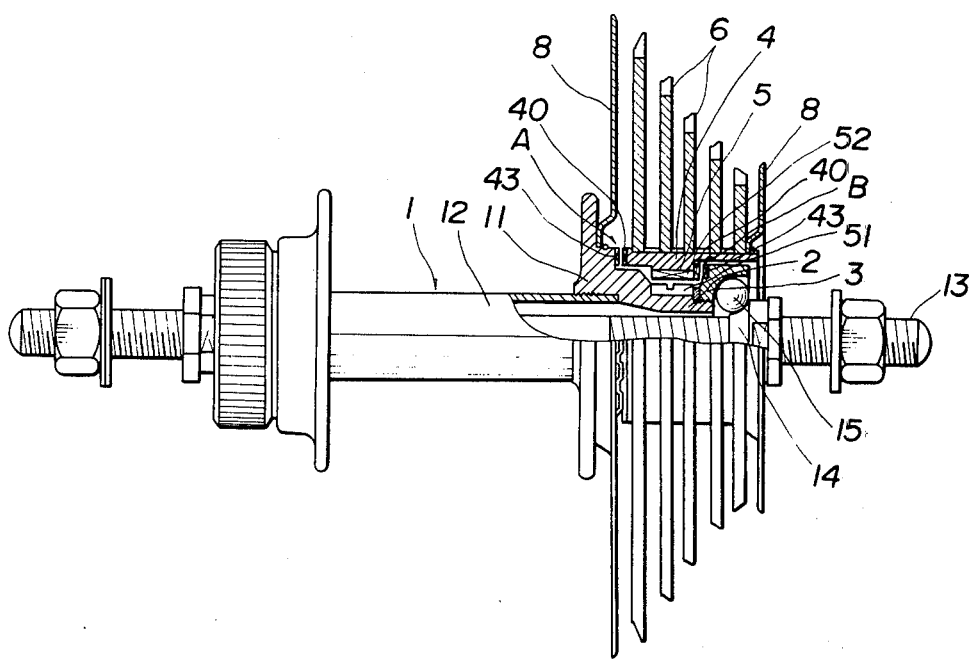

United States Patent [19]

Nagano et al.

[11] 4,116,319
[45] Sep. 26, 1978

[54] REAR GEAR FOR A BICYCLE

[75] Inventors: Masashi Nagano; Etsuyoshi Watarai, both of Sakai, Japan

[73] Assignee: Shimano Industrial Company Limited, Osaka, Japan

[21] Appl. No.: 798,140

[22] Filed: May 18, 1977

[30] Foreign Application Priority Data

May 25, 1976 [JP] Japan ................................. 51-60816
May 25, 1976 [JP] Japan ................................. 51-60817

[51] Int. Cl.² ...................... F16D 41/04; F16H 11/08
[52] U.S. Cl. ................................. 192/64; 74/217 B; 74/243 R; 192/48.4
[58] Field of Search ............. 192/48.4, 64; 74/243 R, 74/217 B

[56] References Cited

U.S. PATENT DOCUMENTS

| 3,492,883 | 2/1970 | Maeda | 74/217 B |
| 3,554,340 | 1/1971 | Shimano | 192/64 |
| 3,769,848 | 11/1973 | McGuire | 74/217 B |

Primary Examiner—Allan D. Herrmann
Attorney, Agent, or Firm—Farrell R. Werbow

[57] ABSTRACT

A rear gear for a bicycle, in which a driving member having two or more sprockets is supported rotatably and axially movably with respect to a driven member. Clutch mechanisms are provided at the axially opposite surfaces between the driving and the driven members so that the driving member may be axially moved to cooperate with the driven member through the connection of each of the clutch mechanisms, thereby permitting rotation of the driving and driven members together.

10 Claims, 7 Drawing Figures

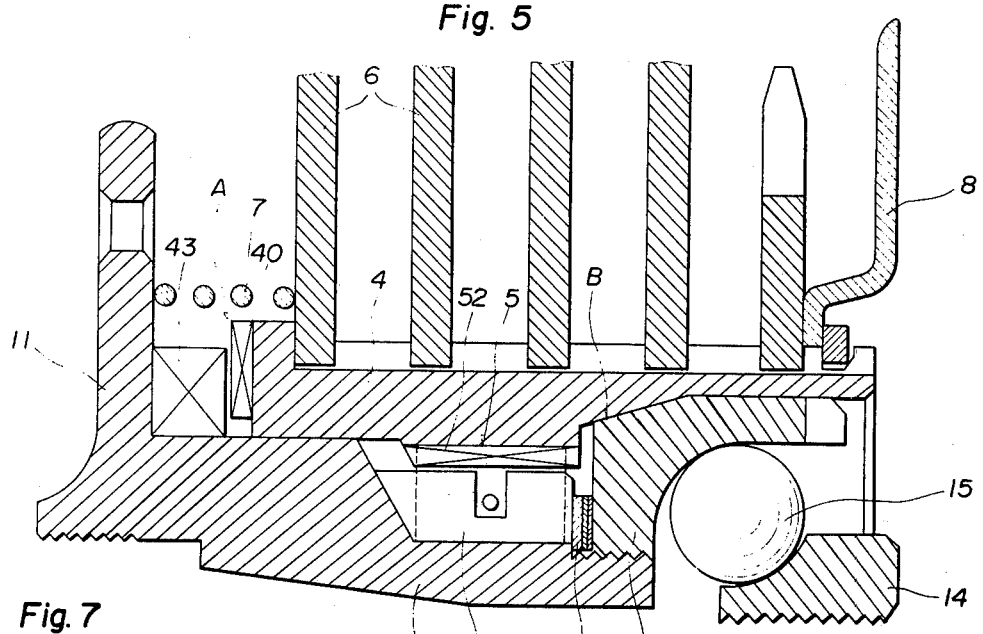
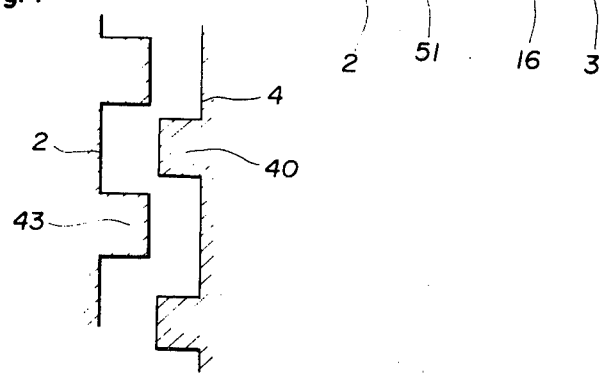

REAR GEAR FOR A BICYCLE

This invention relates to a rear gear for a bicycle and more particularly to a rear gear supported on a rear wheel hub of the bicycle, provided with two or more sprockets, and used together with a freely rotatable front gear to form thereby an improved so-called front-free-system.

Conventionally, a drive means of the so-called free-front-system has been proposed in the specification and the drawings of U.S. Pat. No. 3,492,883, in which a front gear is mounted to a crank means through a unidirectional transmission so that a driving chain moved across the front and the rear gears may travel therebetween without cranking the pedals.

The rear gear fixed to the rear wheel hub, the so-called fixed gear, is used for the drive means. However, if the driving chain continuously moving across the front and/rear gears while the bicycle is running, should contact a foreign object the chain is suddenly stopped thereby causing the wheel to suddenly stop. Hence, the rear gear is made to be freely rotatable and the rotational resistance of this free rotation is made larger than the rotational resistance at the front gear more specifically, the rear gear is made rotatable in only one direction through a unidirectional transmission provided thereto and the spring force applied to pawls of the unidirectional transmission at the rear gear is made larger than the spring force to the pawls of the unidirectional transmission at the front gear. Hence, the pawls of the transmission of the rear gear are meshed more strongly with ratchet teeth of the transmission, to cause the rear gear to rotate together with the wheel even without pedalling, thereby allowing the driving chain to move.

In the foregoing construction, there is the problem in that the spring force applied to the pawls is too complicated to be adjusted, resulting in deterioration after long use to hinder the chain travel, thereby making difficult the speed change while not pedalling.

The invention has been designed in view of the aforesaid problem. An object of the invention is to provide a rear gear simple in construction, reliable to move the chain across the gears for changing the speed, and operable of a smooth and secure speed change.

In detail, the rear gear comprising sprockets and a driving member carrying the sprockets for the speed change is axially moved by means of the chain which is moved axially of the sprockets by means of a derailleur. Clutch mechanisms forcibly engage the driving member with the rear hub or driven member rotating jointly therewith, thereby making sure of the joint rotation of the driving member with the rear hub.

In addition, when no speed-change is being carried out, the driving member rotates jointly with the rear hub or the driven member through engagement with the clutch mechanism, or rotates freely by disconnection therefrom due to the construction or the jaw shape of the clutch mechanism, selection of which depends upon the kind of clutch mechanism being contemplated.

Figure 2:
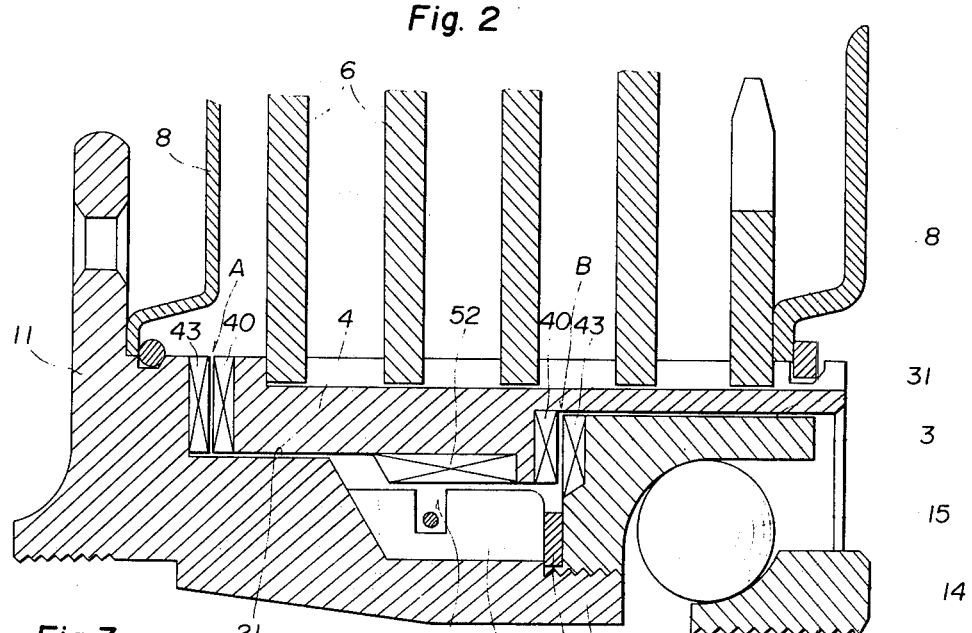
Figure 3:
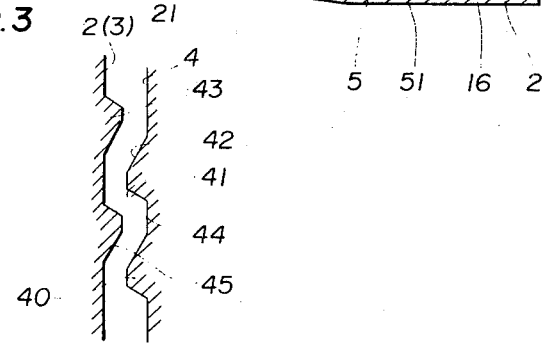
Figure 6:
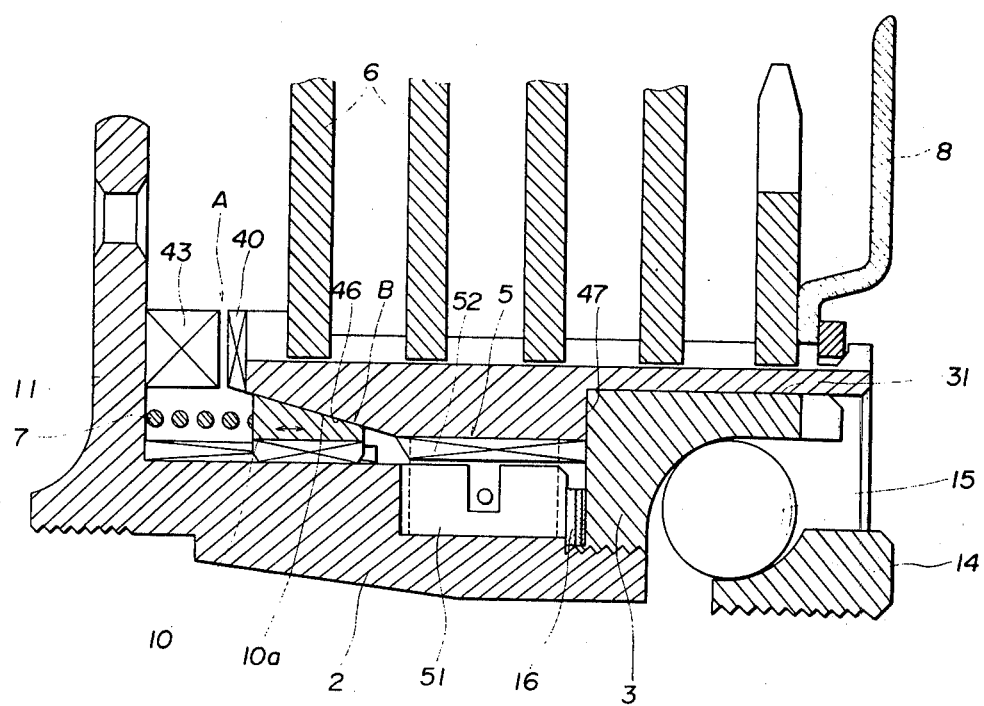

These and other objects, features and advantage of the invention will become more apparent upon a reading of the following detailed description and the drawings, in which:

FIG. 1 is a rear view of the rear gear incorporated with the rear wheel hub, the principal portion being broken away for clearness, FIG. 2 is an enlarged sectional view of the principal portion of the rear gear shown in FIG. 1, FIG. 3 is an enlarged partial view of the clutch mechanism of the rear gears shown in FIGS. 1 and 2, FIGS. 4 to 6 show modified embodiments in enlarged sectional views corresponding to FIG. 2 respectively, and FIG. 7 is an enlarged partial view of the clutch mechanism of the rear gears shown in FIGS. 5 and 6.

Referring to the drawings, the rear gear is incorporated with a rear wheel hub to form a unit hub. In FIG. 1, the reference numeral 1 designates generally a rear hub, and 11, a right side flange fixed to a hub shell 12 of the rear hub 1. The flange is incorporated with a driven member 2, a component of the rear gear of the invention. The driven member 2, which is formed of an axial extension of the hub flange 11, or, separately formed to be screwed thereto, is cylindrically shaped and has a bearing means 3 of cylindrical shape screwed to its outer periphery at one end thereof. The reference numeral 4 designates a driving member of a cylindrical shape. The driving member 4 is rotatably supported to the driven member 2 and bearing means 3 through its inner periphery contacting the outer periphery 21 of the driven member 2 and the outer periphery 31 of the bearing means 3 respectively. Also, the driving member 4 is provided with ratchet teeth 52 which together with one or more, normally two, pawls formed at the outer periphery of the driven member 2 at its inner periphery opposite to the outer periphery 21 of the driven member 2 form a unidirectional transmission 5. The unidirectional transmission serves to transmit a driving member 4 to the driven member 2 caused by movement of the driving chain (not shown), but not to transmit to the driving member 4 a rotational force from the wheel to the rear hub 1 or driven member 2, thereby making it freely rotating with respect to the driven member 2.

In the foregoing construction the driving member 4 is formed to have an axial length smaller than the sum of axial lengths of the outer peripheries of both the driven member 2 and bearing means 3 screwed thereto and is supported with respect to the driven member 2 in the relation of being axially movable thereto, the driving member and the driven member having axially opposite surfaces formed therebetween.

In greater detail, the opposite surfaces of the driving member 4, the driven member 2 and the bearing means 3, as shown in FIG. 2, are formed between the end face of the driving member 4 at the low speed sprocket 6 side thereof and the root portion of the driven member 2 extending from the hub flange 11, or the flange 11, and between the shoulder formed at substantially the intermediate portion of the inner periphery of the driving member 4 and the inward directing end face of the bearing means 3. Thus the opposite surfaces located at axially both sides, i.e., at both sides in the axially moving direction of the driving member 4 provide a first and a second clutch mechanism A and B respectively.

The clutch mechanisms A and B are important elements of the invention as well as the means for axially movably supporting the driving member 4. Namely, the driving member 4 axially moves to connect the clutch mechanism A or B to join the driving member 4 and the driven member 2 in a rotational direction so that the rotational force transmitted from the wheel to the driven member 2 through the rear wheel hub 1, is transmitted to the driving member 4. Thus the wheel and the driving member 4, i.e., the sprockets 6 and the wheel, rotate integrally with each other when the clutch mechanisms are operating.

Figure 4:
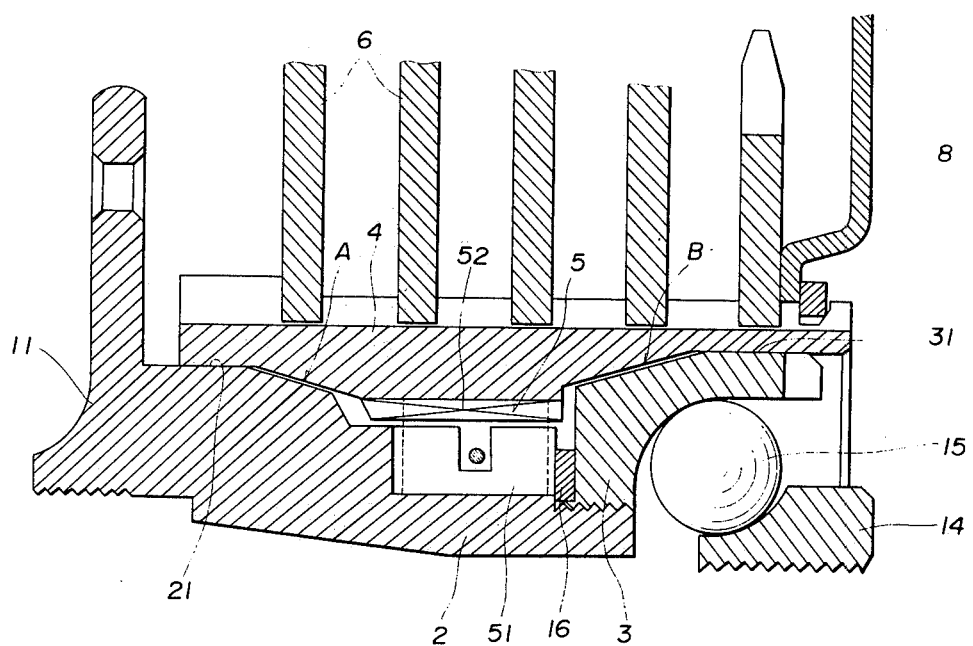

The clutch mechanisms A and B are exemplified by a dog-clutch having engaging jaws as shown in FIG. 2, slant surfaces as shown in FIG. 4 and the combination thereof as shown in FIGS. 5 and 6.

The clutch mechanisms A and B, of the engaging jaw are formed in such a manner that at the surfaces of the driving member 4 are formed teeth 40 having the engaging faces 41 and 42, and at surfaces of the driven member 2 and the bearing means 3 are formed teeth 43 having the engaging faces 44 and 45 in engagement with the faces 41 and 42 respectively. The first clutch mechanism A is connected at its jaws 40 and 43 through the engagement of faces 44 with 41 when the driving member 4 is moved axially toward the low speed sprocket 6 side, whereby the rotational force is transmitted from the driven member 2 to the driving member 4. While, the second clutch mechanism B is connected at its jaws 40 and 43 in the same manner as the former case when the driving member 4 is axially moved toward the high speed sprocket 6 so that the engagement of the engageing faces 44 and 41 may transmit the rotational force from the driven member 2 to the driving member 4 through the bearing means 3.

The driving member 4 is axially moved by the force for shifting the driving chain from one sprocket to another axially thereof by means of the derailleur when the bicycle speed is changed, that is, when the driving chain is shifted from the high speed sprocket to the low speed sprocket the driving member 4 is moved leftward in the drawing so that the first clutch mechanism A is connected at its jaws 40 and 43. When shifting from the low speed sprocket to the high speed sprocket, the driving member 4 is moved rightward, so that the second clutch B is connected at the jaws 40 and 43 thereof.

The jaws 40 and 43 shown in FIG. 3 are formed of projections tapered at both sides thereof to be gentle at the front sides 42 and 45 and steep at the rear sides 41 and 44 in the rotation direction of the driving member 4, driven member 2 and bearing means 3, corresponding to the forward rotation of the bicycle wheel, so that the engagement of the front tapered faces 42 with 45 make it impossible to transmit a driving force, whereas the engagement of the rear tapered faces 41 with those 44 will transmit a driving force.

Hence, when the jaw 40 is meshed with 43 by faces 41 and 44, rotational force from the wheel is transmitted from the rear hub 1 to the driving member 4 through the driven member 2 and the bearing means 3. As a result, the driving member 4 continues to rotate even without pedalling thereby causing the driving chain to travel across the front and rear gears. In the foregoing construction when the bicycle is being pedalled, the driving member 4 is driven through the driving chain so as to transmit a driving force to the driven member 2 through the unidirectional transmission, thereby driving the wheel. At this time, even when the jaws 40 and 43 of the first or the second clutch mechanism A or B are engaged, no driving force is transmitted because the engaging faces 42 and 45 of gentle slope are mutually slidable so that the driving member 4 may return to the neutral. Accordingly, when the pedalling is stopped under the above condition, the driving member 4 stops its rotation to lead to allow the driven member 2, i.e., the rear hub 1, only to freely rotate. Free rotation of the rear hub 1 results in the driving chain not moving in normal running, when no speed change is being made, so that the bicycle is running in safety at high speed. However, such free rotation of the rear hub is not inevitably necessary.

On the other hand, when the bicycle is ridden without pedalling with the jaws connected after the speed change, the driving member 4 already has released the axially biasing force applied thereto by the shifting chain. Hence, the driving member 4 stops its rotation thereby forcing the disengagement of the driven member, to freely rotate through the gentle slopes 42 and 45.

As seen from the aforesaid embodiment, the driving chain, when the bicycle speed is changed, is moved axially of the sprockets to cause the driving member 4 to axially move so as to be rotatable integrally with the rear hub 1 through the first or the second clutch mechanism A or B. Thus the chain is enabled to travel even without pedalling. Therefore, the speed change by the derailleur is made certain and after the speed change the driving member 4 becomes free with respect to the rear hub 1 to stop the chain travel, whereby the safety of bicycle's running is raised to that extent.

Alternatively, the clutch mechanisms A and B, may be formed to have the axially slanted opposite surfaces as shown in FIG. 4 to be frictionally contacted with each other when the driving member 4 is moved axially.

Also jaws 40 and 43 may be made the square as shown in FIG. 7.

In this instance, a spring 7 as shown in FIGS. 5 and 6, is inserted between the driving member 4 and the driven member 2 or between the driving member 4 and the hub flange 11 integrated with the driven member 2 while the second clutch mechanism B is the spiral clutch as shown in FIG. 3 or the tapered opposite surfaces to be frictionally contacted as shown in FIG. 4.

In addition, the spring 7 serves, when the driving member 4 is moved toward the low speed sprocket side for changing the speed and the first clutch mechanism A is connected, to return the driving member 4 concurrently with the completion of the speed change to the disconnected position. Also spring 7 is sufficiently strong only to push the driving member 4 toward the second clutch mechanism B side, i.e., rightward in FIGS. 5 and 6. Spring 7 may be located between the hub flange 11 and the sprocket 6 as shown in FIG. 5.

In the foregoing construction, when the driving member 4 is moved toward the low speed sprocket when the bicycle is moving, the jaws 40 and 43 of A engage while when the driving member 4 is moved toward the high speed sprocket, jaws 40 and 43 of B engage. Hence, the rotation of the wheel is transmitted to the driving member 4 even without the pedalling, so that the driving chain may be moved across the gears, thereby securing the speed change.

After the speed change is completed, the first clutch mechanism A is disconnected due to the driving member 4 being pushed to the right by the spring 7 and thereafter the driving member 4 continues to rotate together with the wheel through the second clutch mechanism B. In this condition, if pedalling commences to drive the driving member 4 through the driving chain, the driving force is transmitted to the driven member 2 through the unidirectional transmission 5.

If the pedalling is stopped while the bicycle is moving the driving member 4 tends to stop rotating due to no driving force being applied thereto, however, it will continue to rotate together with the rotating wheel through the second clutch mechanism B as a result of the spring 7 force being applied thereto, thereby allowing the chain to move. While the chain is moving, should a foreign object be caught between the front gear and the chain so that the travelling chain is subjected to a resistance over the predetermined range, the driving member 4 immediately stops its rotation and the wheel only freely rotates.

Alternatively to FIG. 5 the second clutch mechanism B may be provided at the first clutch mechanism mounting side of the driving member 4.

In detail, the second clutch mechanism B shown in FIG. 6, is composed of the radially tapered surface 10a of a cone 10 provided at the outer periphery of the driven member 2 in the relation of being axially movable therewith, and the tapered surface 46 formed at the inner periphery of the end portion of the driving member 4 at the low speed sprocket mounting side thereof. A spring 7 is inserted between the cone 10 and the hub flange 11. As a further alternative, the tapered surface 10a of the cone 10 may be formed at the inner periphery of the cone, where the tapered surface 46 is formed at the outer periphery 21 of the driven member 2.

This construction is the same as in the former embodiment in that the first clutch mechanism A is engaged to cause the driving member 4 to rotate through the wheel when the speed is changed from high to to low, while, the frictional contact of the second clutch mechanism B, i.e. the contact of the shoulder 47 of the driving member 4 with the bearing means 3, allow the driving member 4 to rotate when the speed is changed from low to high. After the speed change from high to low is completed, the force of spring 7 causes the driving member 4 to move to the right so as to disconnect the first clutch mechanism A and then the wheel rotation is transmitted to the driving member 4 through the contact of the second clutch mechanism B.

In the aforesaid constructions, the driven member 2 is integral with the hub flange 11 to form the unit hub. However, the driven member 2 may be formed independently from the rear hub 1.

In addition, in the drawings the reference numeral 8 designates a chain guard; 13, a hub shaft; 14, a ball race screwed to the hub shaft 13; 15, a ball inserted between the ball race 14 and the bearing means 3; and 16, liners.

As is clearly understood from the abovementioned description, the rear gear of the invention is provided with a driving member having sprockets, supported rotatably in only one direction with respect to a rear wheel hub as a result of an unidirectional transmission, and made movable in the axial direction of the rear wheel hub with the clutch mechanisms mounted between the driving member and the rear wheel hub or the driven member, so that the driving member may engage with the rear hub when the driving chain is shifted in the axial direction of the sprockets through the derailleur for the speed change and be rotatable to cause the chain to travel across the front and the rear gears. Hence, a speed change may be accomplished even without pedalling.

Furthermore, the rear gear of the invention is simple in construction as compared with the conventional right gear and is subject to less failure of operation, and also enables the driving chain to stop its movement when no speed change is carried out. Even if the movement of the chain is not stopped during normal operation, the driving member stops its rotation when a resistance in excess of the predetermined range is applied to the driving chain to prevent its moving, for example, in the event obstacles get between the chain and the front gear.

While the embodiments of the invention have been shown and described, the invention is not limited to the specific construction thereof, which is merely exemplified in the specification rather than defined.

What is claimed is:

1. A rear gear mounted to a rear wheel hub of a bicycle, said rear gear comprising,
    (a) a cylindrical driven member rotatable jointly with said rear wheel hub,
    (b) a cylindrical driving member supported on the outer periphery of said driven member,
    said driving member being radially positioned at its inner periphery with respect to the outer periphery of said driven member, being supported rotatably with respect to said driven member, and being movable axially of said driven member, said driving member and driven member forming therebetween axially opposite surfaces, said driving member having at its outer periphery two or more differently sized sprockets,
    (c) a unidirectional transmission provided between the radially opposite surfaces of said driving member and said driven member, said transmission serving to transmit a rotational force in only one direction from said driving member to said driven member, and
    (d) a clutch mechanism provided between axially opposite surfaces of said driving member and said driven member,
    said clutch mechanism being engageable to allow said driving member and said driven member to rotate together when said driving member is axially moved, a rotational force being transmitted from said rear wheel hub to said driving member through said driven member.

2. The rear gear as set forth in claim 1, wherein the opposite surfaces of said driven member and driving member in the axially moving direction thereof toward the low speed sprocket are provided with engageable teeth so that the first clutch mechanism is formed and including between the radially opposite surfaces of said driving member and driven member at the low speed sprocket side a cylindrical tapered cone having a tapered surface, in the relation of being axially movable, and a spring inserted between said tapered cone and said driven member for biasing said cone in an axial direction, one of the inner periphery of said driving member and the outer periphery of said driven member having a tapered surface slidably engageable with said tapered surface of the cone.

3. The rear gear as set forth in claim 1, wherein said driven member is formed integrally with said rear wheel hub, said rear wheel hub having been provided with a surface axially opposite to the axially directing surface of said driving member.

4. The rear gear as set forth in claim 1, wherein the axially opposite surfaces of said driving member and driven member have engageable teeth to form the clutch mechanism, said driving member being axially movable to cause said teeth to engage.

5. The rear gear as set forth in claim 4, wherein said engageable teeth are tapered at the front side thereof in the rotational direction of said driving member in the forward movement of the bicycle, so that the teeth may be slidable with respect to each other when a rotational force is transmitted from said driving member to said driven member.

6. The rear gear as set forth in claim 2, including a spring between said driven member and said driving member, and wherein said engageable teeth are squarely formed, said spring biasing said driven member and said driving member for disengagement.

7. The rear gear as set forth in claim 1, wherein opposite surfaces are provided between said driving member and said driven member, said opposite surfaces being located at both sides of said driving member in the axially moving direction thereof, both said opposite surfaces having therebetween clutch mechanisms.

8. The rear gear as set forth in claim 7, wherein said clutch mechanisms are axially inclined opposite surfaces at both sides of said driving member in the direction of movement.

9. The rear gear as set forth in claim 7, wherein a first clutch mechanism is provided at one side of said driving member in the direction of movement toward the low speed sprocket, said first clutch mechanism comprising engageable teeth formed at said opposite surface, and a second clutch mechanism is provided at the other side of said driving member in the direction of movement toward the high speed sprocket, said second clutch mechanism being formed of said opposite surfaces which are axially inclined.

10. The rear gear as set forth in claim 7, wherein the engaging teeth of said first clutch mechanism are squarely formed, and between said driven member and said driving member is provided a spring for urging said driving member in the direction of movement of said second clutch mechanism.

* * * * *